United States Patent
Laflen et al.

(10) Patent No.: US 8,995,793 B1
(45) Date of Patent: Mar. 31, 2015

(54) MOVING OBJECT SUPER-RESOLUTION SYSTEMS AND METHODS

(75) Inventors: John Brandon Laflen, Niskayuna, NY (US); Glen William Brooksby, Glenville, NY (US); Christopher Greco, Clifton Park, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 957 days.

(21) Appl. No.: 12/901,459

(22) Filed: Oct. 8, 2010

Related U.S. Application Data (60) Provisional application No. 61/250,428, filed on Oct. 9, 2009.

(51) Int. Cl.
G06K 9/32 (2006.01)
G06T 7/40 (2006.01)

(52) U.S. Cl.
CPC ........................................ *G06T 7/40* (2013.01)
USPC .......................................................... 382/299

(58) Field of Classification Search
None
See application file for complete search history.

(56) References Cited

U.S. PATENT DOCUMENTS

| | | | | |
|---|---|---|---|---|
| 4,910,786 | A * | 3/1990 | Eichel | 382/199 |
| 7,336,806 | B2 * | 2/2008 | Schonberg et al. | 382/117 |
| 7,523,078 | B2 * | 4/2009 | Peot et al. | 706/12 |
| 7,835,594 | B2 * | 11/2010 | Riley et al. | 382/299 |
| 7,885,453 | B1 * | 2/2011 | Wallack et al. | 382/145 |
| 8,055,101 | B2 * | 11/2011 | Intwala | 382/299 |
| 8,279,341 | B1 * | 10/2012 | Bozinovic | 348/452 |
| 8,505,210 | B2 * | 8/2013 | Gribble et al. | 33/701 |
| 2005/0232514 | A1 * | 10/2005 | Chen | 382/298 |
| 2006/0060759 | A1 * | 3/2006 | Predina et al. | 250/216 |
| 2009/0041349 | A1 * | 2/2009 | Suzuki et al. | 382/168 |
| 2009/0154832 | A1 * | 6/2009 | Pham | 382/280 |
| 2010/0034476 | A1 * | 2/2010 | Kido | 382/243 |
| 2010/0253796 | A1 * | 10/2010 | Yano et al. | 348/222.1 |
| 2010/0259607 | A1 * | 10/2010 | Kennedy et al. | 348/113 |
| 2012/0243797 | A1 * | 9/2012 | Di Venuto Dayer et al. | 382/218 |

OTHER PUBLICATIONS

Schultz, Richard R., Li Meng, and Robert L. Stevenson. "Subpixel motion estimation for super-resolution image sequence enhancement." Journal of visual communication and image representation 9.1 (1998): 38-50.*

(Continued)

*Primary Examiner* — Stephen R Koziol
*Assistant Examiner* — Sean Conner
(74) *Attorney, Agent, or Firm* — McDermott Will & Emery LLP (57) ABSTRACT

In some approaches, super-resolution of static and moving objects can be performed. Results of moving object super-resolution may be improved by means of performing image co-registration. The quality of images of moving objects in an automated form may be improved. A sequence of images may be processed wherein objects can be detected and tracked in succeeding frames. A small region around a tracked object may be extracted in each frame. These regions may be co-registered to each other using frequency domain techniques. A set of co-registered images may be used to perform super-resolution of the tracked object. Also described are image processing systems and articles of manufacture having a machine readable storage medium and executable program instructions.

26 Claims, 8 Drawing Sheets

(56) References Cited

OTHER PUBLICATIONS

Reddy, B. Srinivasa, and Biswanath N. Chatterji. "An FFT-based technique for translation, rotation, and scale-invariant image registration." Image Processing, IEEE Transactions on 5.8 (1996): 1266-1271.*

Park, Sung Cheol, Min Kyu Park, and Moon Gi Kang. "Super-resolution image reconstruction: a technical overview." Signal Processing Magazine, IEEE 20.3 (2003): 21-36.*

Gonzalez, Ruben. "Fourier based registration of differentially scaled images." ICIP. 2013.*

Perera, et al., "Multi-Object Tracking Through Simultaneous Long Occlusions and split-Merge Conditions," Proc. IEEE Conf. on Computer Vision and Pattern Recognition, 2006.

Perara, et al., "Evaluation of Algorithms for Tracking Multiple Objects in Video," Proceedings of IEEE Workshop on Applied Imagery and Pattern Recognition, 2006.

Perera, et al., "Moving Object Segmentation Using Scene Understanding," Proceedings of the IEEE Workshop on Perceptual Organization in Computer Vision, 2006.

Kaucic, et al. "A Unified Framework for Tracking Through Occlusions and Across Sensor Gaps;" Proc. IEEE Conf. on Computer Vision and Pattern Recognition, 2005, pp. 990-997.

Liu, et al., "Wavelet Domain Image Super-Resolution Reconstruction Based on Image Pyramid and Cycle-Spinning," Journal of Physics; Conference Series, vol. 48, pp. 417-421, 2006.

Baker et al., "Limits on Super-Resolution and How to Break Them," IEEE Transactions on Pattern Analysis and Machine Intelligence, vol. 24, No. 9, pp. 1167-1183, Sep. 2002.

Wheeler, et al., "Super-Resolution Image Synthesis Using Projections onto Convex Sets in the Frequency Domain," Proceedings of the IS&T/SPIE Symposium on Electronic Imaging, Conference on Computational Imaging. San Jose, CA: IS&T/SPIE, Jan. 2005.

R. J. Marks II, "Alternating Projections Onto Convex Sets," Deconvolution of Images and Spectra, P. A. Jansson, Ed. Academic Press, 1997, ch. 14, pp. 476-501.

Rago, et al., "Stereo Spatial Super-Resolution Technique for Multiple Reentry Vehicles;" Proceedings of the IEEE Aerospace Conference, IEEE, 2004.

Kim, et al., "Recursive Reconstruction of High Resolution Image From Noisy Undersampled Multiframes," IEEE Transactions on Acoustics, Speech and Signal Processing, vol. 38, No. 65, pp. 1013-1027, 1990.

Shi, et al., "Good Features to Track;" Proc. IEEE Conf. on Computer Vision and Pattern Recognition, 1994, pp. 593-600.

* cited by examiner

MOVING OBJECT SUPER-RESOLUTION SYSTEMS AND METHODS

RELATED APPLICATION

The present application claims priority to U.S. Provisional Patent Application No. 61/250,428, filed Oct. 9, 2009 and entitled "Moving Object Super-Resolution Systems and Methods," the entire content of which is incorporated herein by reference.

FIELD OF THE DISCLOSURE

The present invention generally relates to image processing, and more particularly to super-resolution of moving objects in video imagery.

BACKGROUND OF THE DISCLOSURE

Image quality can affect any of a number of imaging applications. For example, surveillance platforms can be affected by the ultimate resolution afforded by the imaging system, including optics and image processing subsystems. One approach to increasing resolution involves utilizing improved optics, but this can be cost-prohibitive. Another approach toward improving the resolution of surveillance images involves super-resolving images. Super-resolution (SR) is a technique that enhances the resolution of an imaging system. There are both single-frame and multiple-frame variants of SR.

The aim of SR is to estimate a high resolution image from several low resolution images of the same scene. SR gains result from a combination of noise reduction, de-aliasing and deblurring, or high-spatial frequency restoration. SR has a long history, primarily of applications to whole images of static scenes.

Multiple image frame SR algorithms are designed to combine several images of a scene to produce one higher resolution image. Before a set of images or frames can be super-resolved, they are typically registered. In general, image super-resolution algorithms model the image registration as translations or homographies. In aerial surveillance applications, such a registration model generally works well for a static ground scene. However, when objects are moving in the scene, they are not properly registered by this model and the effect on the super-resolved image is distortion in the local area of the moving object.

SUMMARY OF THE DISCLOSURE

In some approaches, super-resolution of static and/or moving objects can be performed. According to various aspects of the subject disclosure, results of moving object super-resolution may be improved by means of performing image co-registration. In some aspects, the quality of images of moving objects in an automated form may be improved. A sequence of images may be processed and objects can be detected and tracked in succeeding frames. A small region around a tracked object may be extracted in each frame. These regions may be co-registered to each other using frequency domain techniques. A set of co-registered images may be used to perform super-resolution of the tracked object.

In the following description, reference is made to the accompanying drawings that form a part of the description, and in which are shown by way of illustration specific embodiments in which the disclosure may be practiced. It is to be understood that other embodiments may be utilized and changes may be made without departing from the scope of the present disclosure.

BRIEF DESCRIPTION OF THE DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings.

DETAILED DESCRIPTION

Illustrative embodiments are now described. Other embodiments may be used in addition or instead. Details that may be apparent or unnecessary may be omitted to save space or for a more effective presentation. Conversely, some embodiments may be practiced without all of the details that are disclosed.

Embodiments of the present disclosure are directed to systems and methods of super-resolution applied to moving objects indicated in multiple images. In some approaches, super-resolution of static and moving objects can be performed. According to various aspects of the subject disclosure, results of moving object super-resolution may be improved by means of performing image co-registration. In some aspects, the quality of images of moving objects in an automated form may be improved. A sequence of images may be processed wherein objects can be detected and tracked in succeeding frames. A small region around a tracked object may be extracted in each frame. These regions may be co-registered to each other using frequency domain techniques.

A set of co-registered images may be used to perform super-resolution of the tracked object.

A homography may be calculated between each full image frame that allows an algorithm to know how pixel coordinates map between frames. From the homography, an integer number of pixels that an object shifts between frames may be calculated. As images are processed and objects detected and tracked, small regions of interest around a tracked object may be selected, or chipped out, of the original images. In some aspects, subsequent image chips may then be extracted (e.g., without interpolation) around each object in a sequence of frames. These individual image chips may then be provided to a registration algorithm which may co-register each chip to the first chip in the sequence. This registration step may provide a fractional pixel shift of the object location between frames. The image chips, along with the fractional pixel shift information, may be provided to a super-resolution algorithm to enhance the resolution of object. The output may be an enhanced image of the tracked object of interest.

Image super-resolution can include image de-noising, compensation for the point-spread-function (PSF) of the acquisition system, and de-aliasing in the Fourier domain. Such algorithms can collect information across multiple-observations to generate a single, higher-resolution image. Super-resolution offers the potential to reconstruct higher spatial-frequency image content through de-aliasing. This feature may lead to more precisely resolved fine structures, which can be valuable in applications as varied as intelligence, security, surveillance, and medical imaging. Super-resolution algorithms can utilize multiple observations to provide information about frequency content that is strictly above the Nyquist limit of the imaging system used to obtain the images. This extra information can be encoded in the lower frequency components through aliasing, but can also be estimated across multiple observations that satisfy certain requirements. Such encoding can manifest when observations are collected at relative fractional shifts of the sampling plane, which might arise from camera vibrations. It is also possible to observe fractional shifts in a sub-scene of the acquired imagery, most notably due to moving objects. Therefore, it is possible to take advantage of the inherent motion of moving objects to implement moving-object super-resolution (MOSR) techniques in accordance with the present disclosure.

Figure 1:
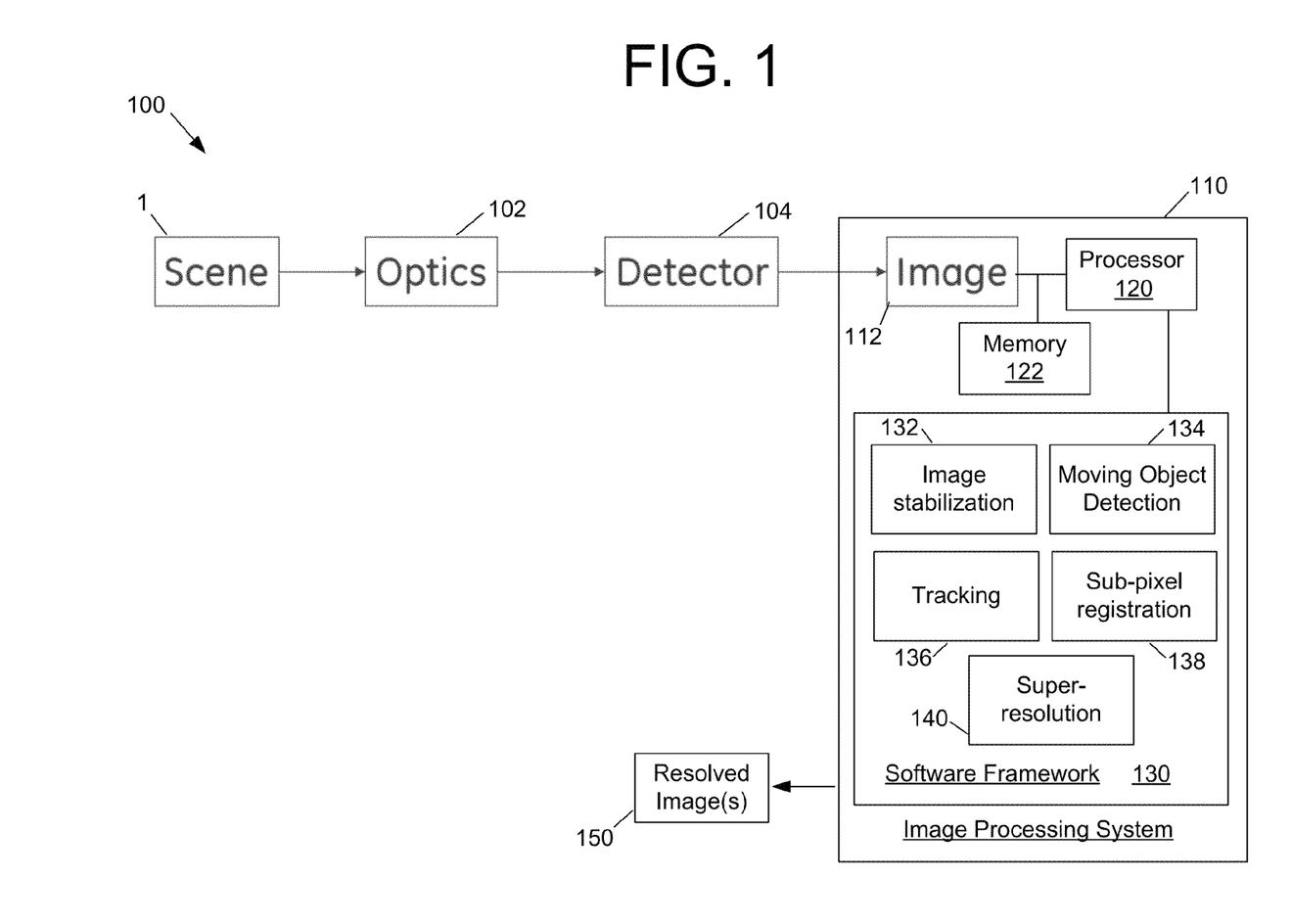
FIG. 1 depicts a schematic diagram of a moving object super-resolution system, in accordance with an exemplary embodiment of the present disclosure.

FIG. 1 depicts a schematic diagram of a moving object super-resolution system 100, in accordance with an exemplary embodiment of the present disclosure. System 100 is end-to-end moving-object super-resolution (MOSR) system, as the system 100 includes imaging optics 102, a suitable detector, and image processing system 110. System 100 can process a scene 1 and produce a resolved image 150 of the scene 1 or portions of it. Image data (indicated by 112) from the detector 104 can be provided to and received by the image processing system 110 for image processing.

Any optical components suitable for imaging may be used for the optics 102. For example, video camera lens or digital camera lens systems made commercially available by Nikon and/or Carl Zeiss for 35 mm digital cameras may be used for optical and NIR imaging. Corresponding detectors may be used for the detector 104 for optical and NIR imaging. It addition to visible and NIR radiation, it will be understood that virtually any wavelength/frequency of radiation may be used for imaging in accordance with the present disclosure, e.g., X-ray, UV, etc.

The image processing system 110 can include a processor 120 and memory 122. Any suitable memory storage media can be used for memory 122, e.g., ROM and/or RAM hardware. Processor 120 and memory 122 may implement a software framework 130, which may include one or more software blocks or modules for implementing an image resolution enhancement algorithm, e.g., a super-resolution algorithm. The system 100 is configured to implement or run basic algorithmic blocks, which can be replaced as the application dictates. Super-resolution of moving objects necessarily implies that the objects to be super-resolved are being tracked from frame to-frame. The software framework can be implemented as algorithmic modules which may be assembled together to perform a given task. For exemplary embodiments, the algorithmic modules can include image stabilization, moving object detection, tracking, sub-pixel registration, and super-resolution. Such a modular approach can allow for simple substitution of alternate algorithmic pieces.

Suitable algorithmic modules can include, but are not limited to, those described in the following: A. Perera, C. Srinivas, A. Hoogs, G. Brooksby, and W. Hu, "Multi-object tracking through simultaneous long occlusions and split-merge conditions," in Proc. IEEE Conf. on Computer Vision and Pattern Recognition, 2006; A. Perera, A. Hoogs, C. Srinivas, G. Brooksby, and W. Hu, "Evaluation of algorithms for tracking multiple objects in video;" in Proceedings of the IEEE Workshop on Applied Imagery and Pattern Recognition, 2006; A. Perera; G. Brooksby, A. Hoogs, and G. Doretto, "Moving object segmentation using scene understanding," in Proceedings of the IEEE Workshop on Perceptual Organization in Computer Vision, 2006; and, R. Kaucic, A. G. A. Perera, G. Brooksby, J. Kaufhold, and A. Hoogs, "A unified framework for tracking through occlusions and across sensor gaps;" in Proc. IEEE Conf. on Computer Vision and Pattern Recognition, 2005, pp. 990-997; the entire contents of all of which are incorporated herein by reference. Various implementations of super-resolution algorithms, including the following, can be used in exemplary embodiments: wavelet-based, e.g., as described in H. C. Liu, Y. Feng, and G. Y. Sun, "Wavelet domain image super-resolution reconstruction based on image pyramid and cycle-spinning," Journal of Physics; Conference Series, vol. 48, pp. 417-421, 2006, international Symposium on Instrumentation Science and Technology; local feature enhancement, e.g., as described in S. Baker and T. Kanade, "Limits on super-resolution and how to break them," IEEE Transactions on Pattern Analysis and Machine Intelligence, vol. 24, no. 9, pp. 1167-1183, September 2002; projection onto convex sets, e.g., as described in F. W. Wheeler, R. T. Hoctor, and E. B. Barrett, "Super-resolution image synthesis using projections onto convex sets in the frequency domain," in Proceedings of the IS&T/SPIE Symposium on Electronic Imaging, Conference on Computational Imaging. San Jose, Calif.: IS&T/SPIE, January 2005 and R. J. Marks II, "Alternating projections onto convex sets," in Deconvolution of Images and Spectra, P. A. Jansson, Ed. Academic Press, 1997, ch. 14, pp. 476-501; multiple view geometry, e.g., as described in C. Rago and H. Landau, "Stereo spatial super-resolution technique for multiple reentry vehicles;" in Proceedings of the IEEE Aerospace Conference, IEEE, 2004; and, direct Fourier-domain methods, e.g., as described in S. P. Kim, N. K. Bose, and H. M. Valenzuela, "Recursive reconstruction of high resolution image from noisy undersampled multiframes," IEEE Transactions on Acoustics, Speech and Signal Processing, vol. 38, no. 6, pp. 1013-1027, 1990; the entire contents of all of which are incorporated herein by reference.

To account for camera motion, subsequent frames can be registered by calculating the incremental homography that warps a previous frame to the current frame. A standard corner tracking algorithm can be used, e.g., as described in J. Shi and C. Tomasi, "Good features to track;" in Proc. IEEE Conf. on Computer Vision and Pattern Recognition, 1994, pp. 593-600, the entire content of which is incorporated herein by reference. With the frames stabilized, moving objects are detected using an enhanced frame differencing algorithm. Detected moving objects are used to initialize a data association tracker. In this way, all homographies and tracked objects are available to the super-resolution, algorithm. Super-resolution algorithms can utilize a buffer of input image chips on which to operate. A tracked object can be specified to the algorithm and, as subsequent frames are processed, a small region of interest (ROI) around the object can be selected, or chipped out, and buffered from each incoming frame. These image chips can then each be independently co-registered to the first chip in the sequence using a frequency domain registration algorithm, e.g., as described herein for FIGS. 3-7. Such algorithms can provide integer and fractional image shift information to the super-resolution algorithm. For exemplary embodiments, a super-resolution algorithm can be used in accordance with the one described in S. P. Kim, N. K. Bose, and H. M. Valenzuela, "Recursive reconstruction of high resolution image from noisy undersampled multi-frames," IEEE Transactions on Acoustics, Speech and Signal Processing, vol. 38, no. 6, pp. 1013-1027, 1990. Other examples of suitable super-resolution algorithms are found in U.S. Patent Application No. 2009/0213238 and U.S. Patent Application No. 2004/0218834, the entire contents of both of which are incorporated herein by reference.

Figure 2:
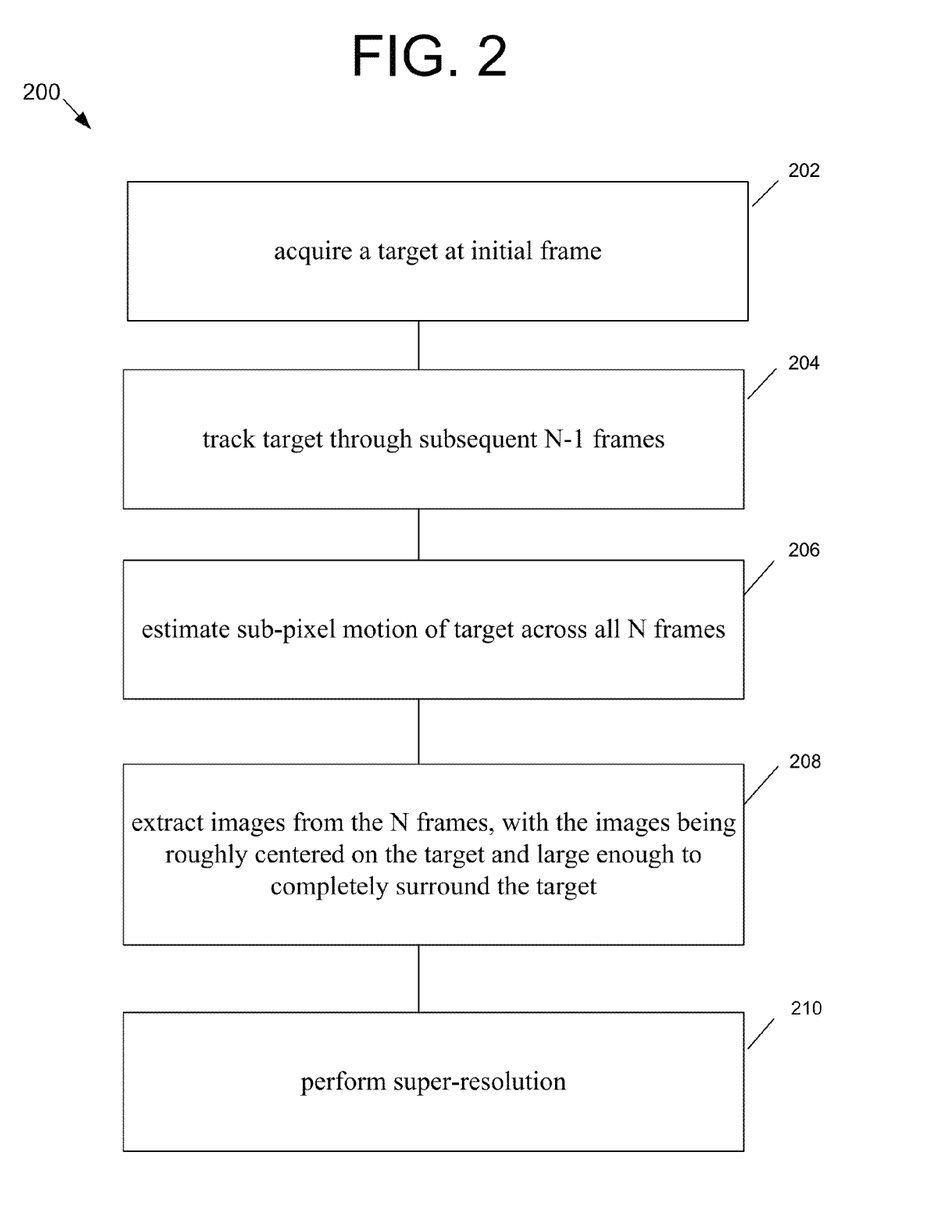
FIG. 2 depicts a block diagram of a super-resolution method, in accordance with exemplary embodiments of the present disclosure.

FIG. 2. depicts a block diagram of high-level super-resolution algorithm/method 200 that can be used for exemplary embodiments of the present disclosure. During the process of performing moving-object super-resolution, the following steps can be performed. A target can be acquired at initial frame, as described at 202. The target can be tracked through subsequent N−1 frames, as described at 204. Sub-pixel motion of target across all N frames can be estimated, as described at 206. The sub-pixel motion estimates indicate how a given pixel in image n maps back onto the initial image frame. Images can be extracted from the N frames, with the images being roughly centered on the target and large enough to completely surround the target, as described at 208. Super-resolution can be achieved as a result, as described at 210.

Figure 3:
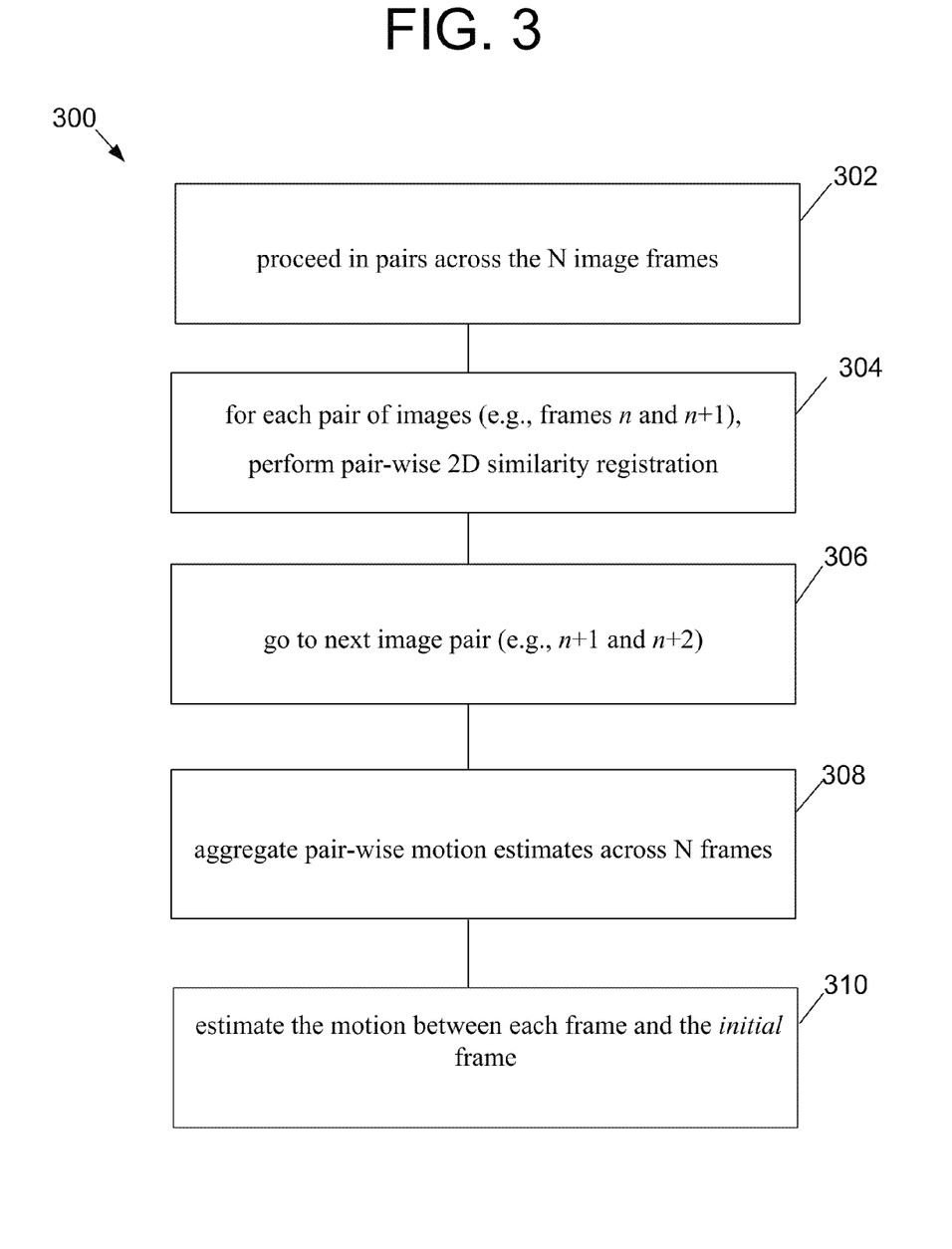
FIG. 3 depicts a block diagram of a sub-pixel motion estimation method, in accordance with exemplary embodiments of the present disclosure.

FIG. 3 depicts a block diagram of a sub-pixel motion estimation algorithm/method 300, in accordance with exemplary embodiments of the present disclosure. As noted previously, sub-pixel motion of target across all N frames can be estimated as part of a super-resolution algorithm/method, e.g., as described at 206 of FIG. 2. Pairs of images can be selected across the N image frames, as described at 302. For each pair of images (e.g., frames n and n+1), pair-wise 2D similarity registration can be performed, as described at 304. The next image pair (e.g., n+1 and n+2) can be obtained, as described at 306. Pair-wise motion estimates can be aggregated across N frames, as described at 308. An estimate can be made of the motion between each frame and the initial frame, as described at 310.

Figure 4:
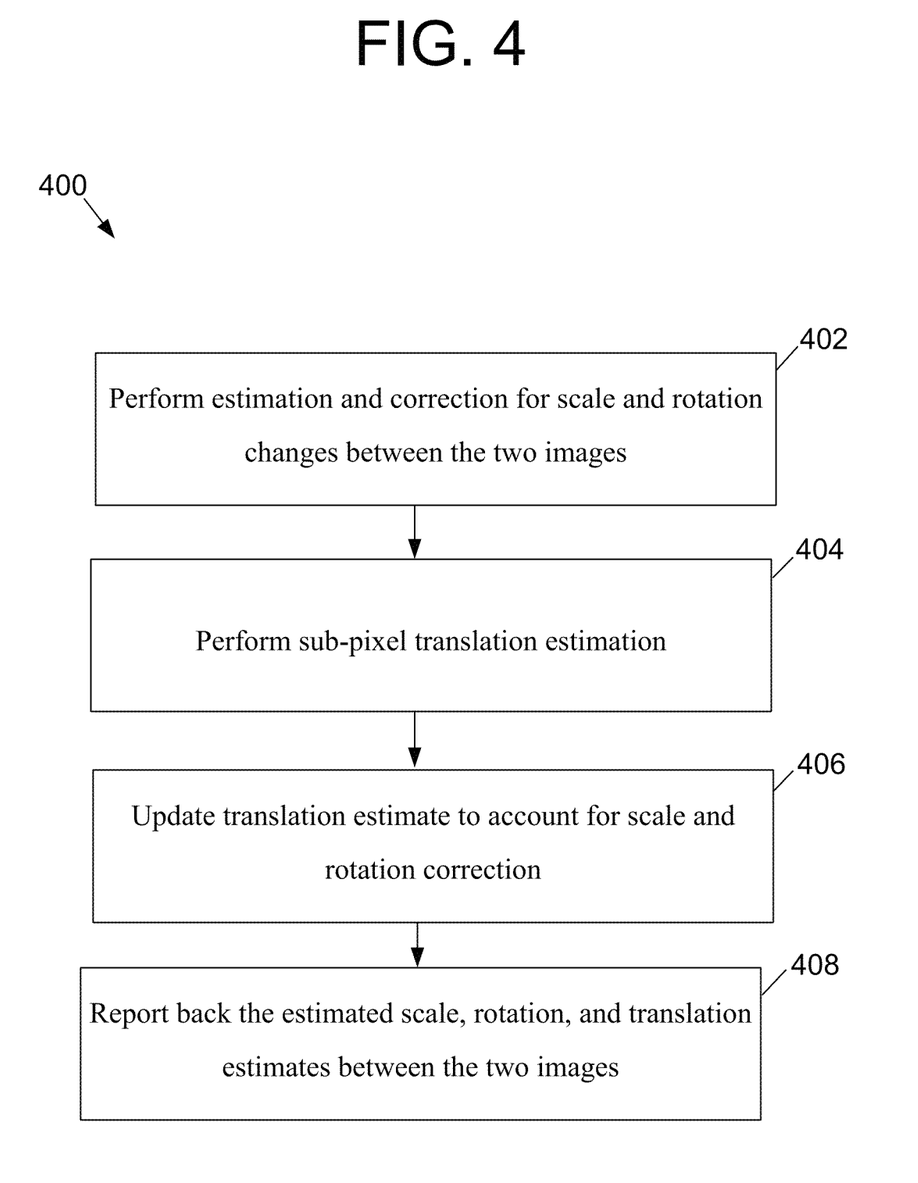
FIG. 4 depicts a block diagram of a two-dimensional similarity registration method, in accordance with embodiments of the present disclosure.

FIG. 4 depicts a high-level flowchart for a pair-wise 2D similarity registration algorithm/method 400, in accordance with further embodiments of the present disclosure. Estimation and correction for scale and rotation changes can be performed between the two images, as described at 402. A sub-pixel translation estimation can be performed, as described at 404. The translation estimate can be updated to account for scale and rotation correction, as described at 406. The estimated scale, rotation, and translation estimates between the two images can be reported back or utilized for other image processing steps, as described at 408.

Figure 5:
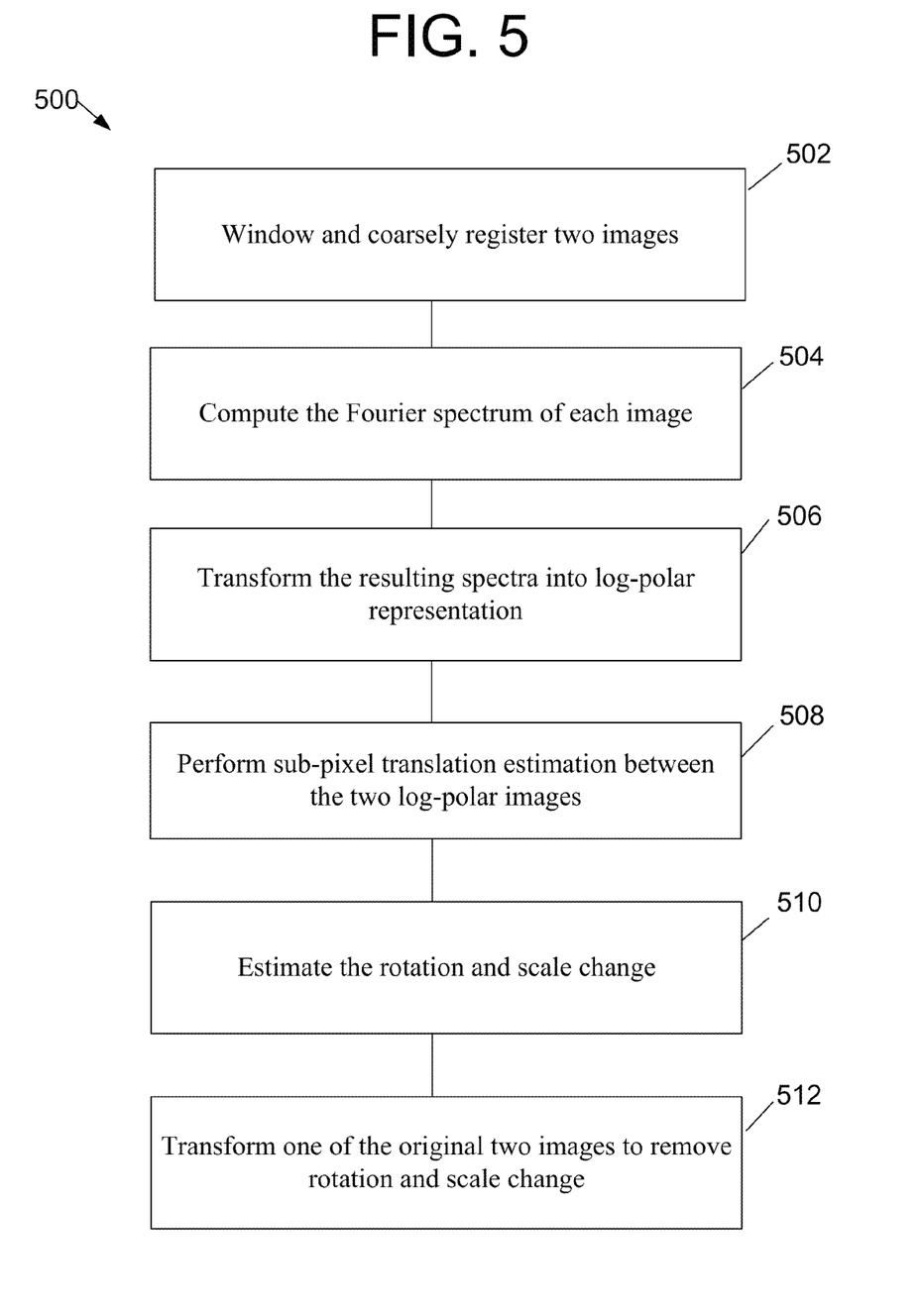
FIG. 5 depicts a block diagram of a further moving object super-resolution method, in accordance with embodiments of the present disclosure.

FIG. 5 depicts a block diagram of a further moving object super-resolution algorithm/method 500, in accordance with further embodiments of the present disclosure. Algorithm/method 500 may be used for 2D similarity registration in exemplary embodiments. Two images, e.g., showing one or more moving objects, may be windowed and coarsely registered, as described at 502. The Fourier spectrum of each image can be computed, as described at 504. For example, a FFT can be used. The resulting spectra can be transformed into respective log-polar images or representations, as described at 506. Optionally high-pass filtering can be performed on the spectra to remove low-frequency energy. The magnitude of each spectral point can be computed. For example, the following formula may be used for the computation: $m(u,v)=\sqrt{Re(s(u,v))^2+Im(s(u,v))^2}$, where $s(u,v)$ is some spectral point and $m(u,v)$ is its magnitude. For a radial operating point, R, and angular delta dt, the magnitude-spectra can be transformed to log-polar by interpolation: $LP(logr, t)=m(U(logr,t), V(logr,t))$, where $U(logr,t)=R*exp(logr)*\cos(t*dt)$, $V(logr,t)=R*exp(logr)*\sin(t*dt)$, and logr and t can be considered integral indices into the corresponding LP matrix. For such transformations, logr and t can begin at zero and can be as large as desired. If the coordinate (U,V) does not coincide with a known point in $m(u,v)$ (e.g., U and/or V are non-integers but u and/or v are always integer indices), then $m(U,V)$ can be calculated by interpolation, e.g., bi-linear, bi-cubic, nearest-neighbor, etc.

Continuing with the description of algorithm/method 500, sub-pixel translation estimation can be performed between the two log-polar images, as described at 508. This can return an estimated change in logr (Dlogr), and an estimated change in t (Dt). Next, the rotation and scale change can be estimated, as described at 510. Rotation change between the two images can be represented by Dt*dt. Scale change between the two images can be represented by the multiplier exp(Dlogr). Finally, one of the original two images can be transformed to remove rotation and scale change, as described at 512. This may require interpolation for some applications.

Figure 6:
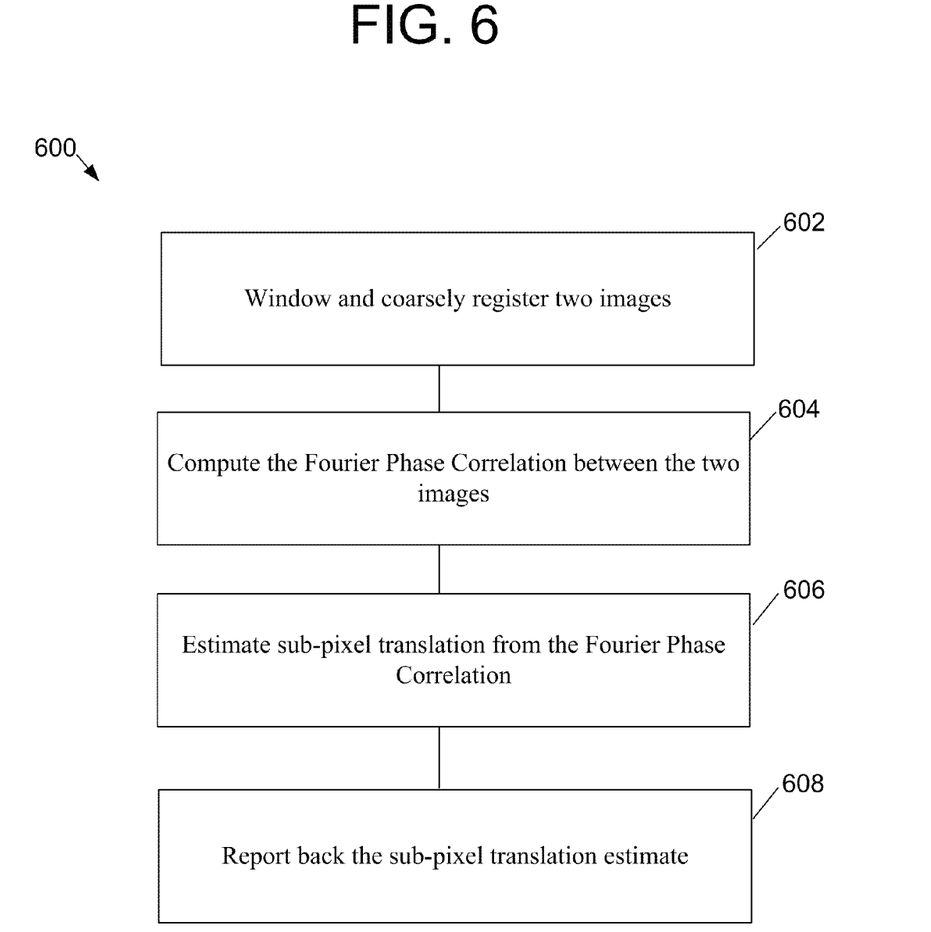
FIG. 6 depicts a block diagram of a further moving object super-resolution method, in accordance with embodiments of the present disclosure.

FIG. 6 depicts a block diagram of a further moving object super-resolution algorithm/method 600, in accordance with embodiments of the present disclosure. Algorithm/method 600 may be used for 2D similarity registration in exemplary embodiments. For algorithm/method 600, two images can be windowed and coarsely registered, as described at 602. The Fourier Phase Correlation between the two images can be computed, as described at 604. For example, in exemplary embodiments, the Fourier spectrum of each image can be computed, e.g., using a FFT. The phase product can be calculated, e.g., by the following: $P(u,v)=s_1(u,v)*s_2(u,v)/(|s_1(u,v)|*|s_2(u,v)|)$, where $s_1$ and $s_2$ are the spectra for the two images, $|s(u,v)|$ is the magnitude of $s(u,v)$. If either $s_1(u,v)$ or $s_2(u,v)$ is zero, then $P(u,v)$ is also zero. Further, the inverse Fourier transform of $P(u,v)$ can be calculated. For this, $p(x,y)=IFFT\{P(u,v)\}$ is the Fourier Phase Correlation.

Continuing with the description of algorithm/method 600, the sub-pixel translation can be estimated from the Fourier Phase Correlation, as described at 606. For this, optionally, the maximum of $p(x,y)$ can be found. The maximum can be $(x_0,y_0)$, such that $p(x_0,y_0) \geq p(x,y)$, for all $(x,y)$. At this point, x, y, $x_0$, and $y_0$ are all integer indices (pixel-level coordinates). The function $p'(x,y,x_0,y_0)$ can be fit to the data $p(x,y)$. $p'(x,y,x_0,y_0)=\sin c(x-x_0)*\sin c(y-y_0)$. $\sin c(x)=\sin(pi*x)/(pi*x)$. Fitting can be accomplished through a variety of mechanisms/techniques, e.g., minimum mean-squared error, computed through gradient descent, etc. After fitting, $(x_0,y_0)$ is the estimated sub-pixel translation. Finally, the sub-pixel translation estimate can be reported back or used at one or more other image processing steps, as described at 608.

Figure 7:
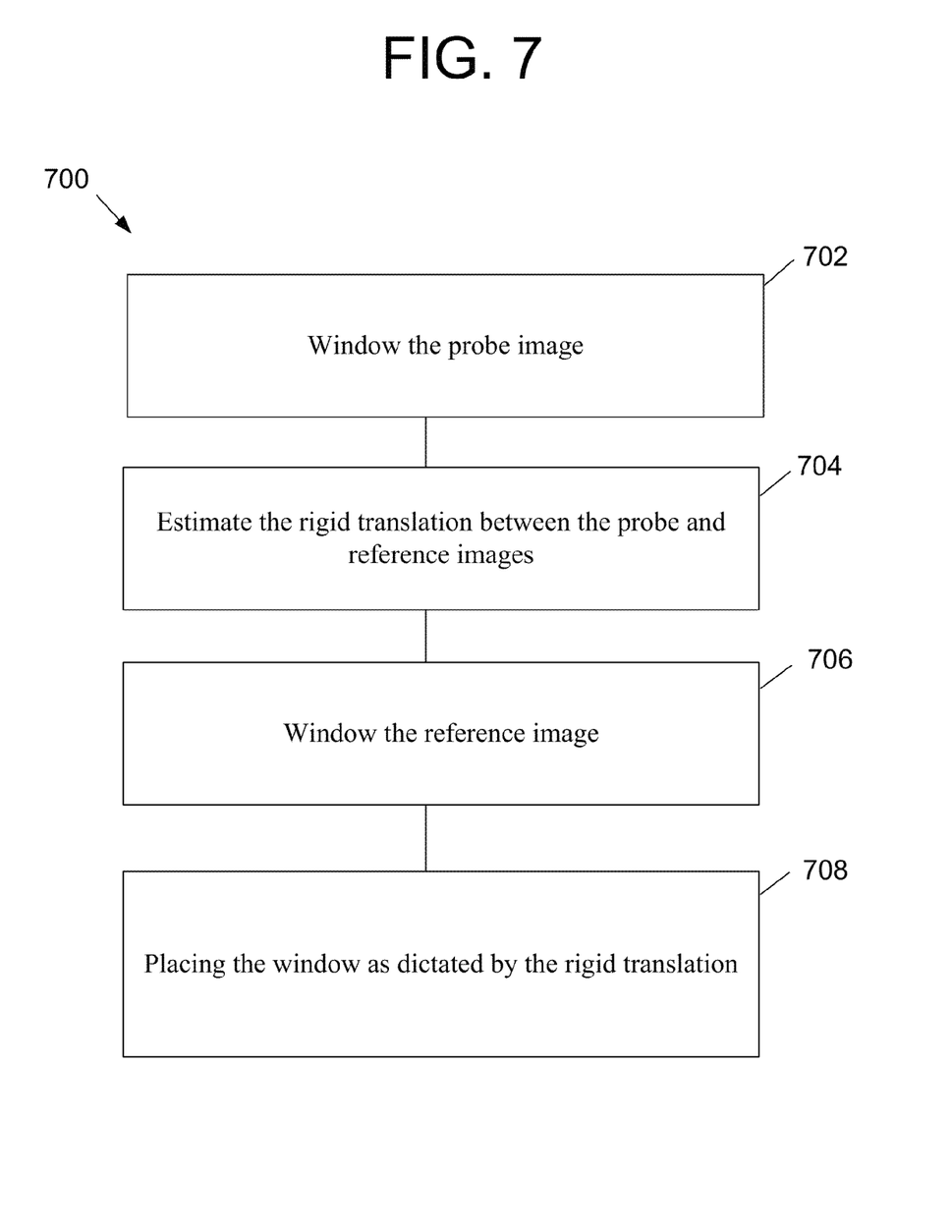
FIG. 7 depicts a block diagram of a further moving object super-resolution method, in accordance with embodiments of the present disclosure.

FIG. 7 depicts a block diagram of a further moving object super-resolution algorithm/method 700, in accordance with embodiments of the present disclosure. Algorithm/method 700 may be used for 2D similarity registration in exemplary embodiments. For algorithm/method 700, a probe image can be windowed, as described at 702. For this, a Hamming, Hanning, or Gaussian window, etc., can be used. The window need not extend across the entire image, if only a sub-component is desired for subsequent registration. This can help focus the algorithm in some applications, especially for moving-objects. Next, an estimate can be made of the rigid translation between the probe and reference images, as described at 704. The (optionally windowed) probe and reference images can be registered using e.g., normalized cross-correlation. As the probe image was windowed, the reference image can also be windowed, as described at 706. The window of the reference image can be placed as dictated by the outcome of the rigid translation, as described at 708.

Figure 8:
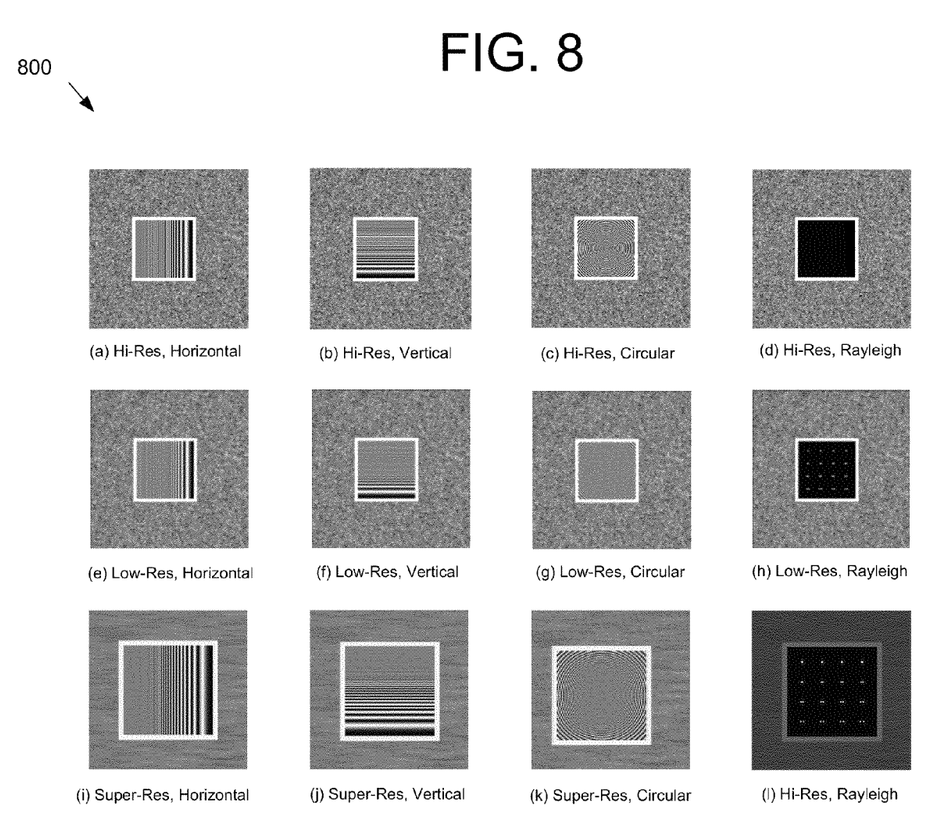
FIG. 8 depicts a set of test targets and results at different resolutions useful for assessing image quality, in accordance with exemplary embodiments of the present disclosure.

FIG. 8 depicts a set 800 of test targets and super-resolution results at different resolutions, in accordance with an implemented embodiment of the present disclosure. Each target shown in FIG. 8 contains features on a continuum from clearly resolvable to not expected to be resolvable in the low-resolution imagery. Each test sequence, at one of three resolutions, consists of one of four test targets traveling from left to right across a textured background. Test targets included (1) horizontal sinusoidal grating, (2) vertical sinusoidal grating, (3) circular sinusoidal grating, and (4) impulses (dots), as shown in FIG. 8. The horizontal vertical, and circular sinusoidal gratings are spatial "chirps" that increase in frequency across the target, with a maximum frequency that were twice the inverse of the decimation factor. The fourth image is a collection of 16 pairs of impulses that are separated at varying fractions of the system Rayleigh distance (relative to the decimation factor). A suitable total of frames, e.g., 100, was generated in each sequence.

Within each sequence, high-resolution frames were rendered and subsequently processed to produce low-resolution imagery. Each high-resolution frame was rendered in a 2000× 2000 pixel image. FIGS. 8a-8d illustrate examples of the high-resolution images. Each high-resolution image was filtered with an optical point-spread-function (PSF) corresponding to a circular aperture, a box PSF representing spatial integration (100% fill factor), and (optionally) a linear phase filter to create sub-pixel shifts (camera jitter). A suitable PSF was selected or estimated to represent the related optical components. The size of the circular aperture relative to the sampling grid can be captured, e.g., by the variable system q value, with $q=\lambda \cdot fN|p$. For example, a diffraction limited system with no aliasing has q>2, e.g., as described in R. D. Fiete, "Image quality and $\lambda FN|p$ for remote sensing systems," *Optical Engineering*, vol. 38, no. 7, pp. 1229-1240, July 1999, the entire contents of which are incorporated herein by reference. Finally, each filtered image was decimated, e.g., at 20:1 or 10:1, producing the low-resolution image. Each low-resolution image can be considered a simulation of acquired imagery. FIGS. 8e-8h illustrate examples of the low-resolution images used in MOSR testing in accordance with the implemented embodiment of the present disclosure. As shown in FIGS. 8i-8l, the implemented MOSR embodiment produced higher resolution images compared to the low resolution images (FIGS. 8e-8h) of set 800.

Some implementations of image enhancement according to the present disclosure may involve programming. For example, a microcontroller may include firmware facilitating image processing for the MOSR as described for FIGS. 1-8. Program aspects of the technology may be thought of as products or articles of manufacture typically in the form of executable code and/or associated data that is carried on or embodied in a type of machine readable medium. Storage type media include any or all of the memory of the supporting electronics of a proximity sensor, computing devices, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor, e.g., as included in a microcontroller. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software.

Hence, a machine readable medium may take many forms, including but not limited to, a tangible non-transitory storage medium, a carrier wave medium or physical transmission medium. Non-volatile types of non-transitory, tangible storage media include, for example, optical or magnetic disks, such as any of the storage devices in any computer(s) or the like. Volatile types of non-transitory, tangible storage media include dynamic memory, such as main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Many of these forms of computer readable media may be involved in carrying one or more sequences of one or more instructions to a processor for execution.

The description of illustrative embodiments is provided to enable any person skilled in the art to practice the various embodiments described herein. While the present disclosure has been particularly described with reference to the various figures and embodiments, it should be understood that these are for illustration purposes only and should not be taken as limiting the scope of the disclosure.

There may be many other ways to implement the embodiments of the present disclosure. For example, while embodiments of the present disclosure have been described in the context of super-resolution, other image enhancement techniques can be implemented within the scope of the present disclosure. For example, interpolation algorithms such as multiple-observation Wiener filtering, can be used with image registration techniques (system components, algorithms, firmware, methods and method steps) in accordance with the present disclosure. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made, by one having ordinary skill in the art, without departing from the spirit and scope of the present disclosure.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of performing moving object super-resolution on a plurality of images including a moving object, the method comprising:
    acquiring a target at an initial frame;
    tracking the target through subsequent N−1 frames, wherein tracking the target through subsequent N−1 frames includes (i) proceeding across the N image frames in pairs of adjacent frames, (ii) for each pair of adjacent frames, performing pair-wise 2D similarity registration, and (iii) aggregating pair-wise motion estimates across N frames, to estimate the motion between each frame and the initial frame;
    calculating sub-pixel motion estimates of the target across all N frames, wherein the sub-pixel motion estimates indicate how a given pixel in each image frame maps back onto the initial image frame;
    extracting an image from each of the N frames, wherein each extracted image is roughly centered on the target and is large enough to completely surround the target;
    computing the Fourier spectrum for the extracted images;
    calculating a magnitude for spectra resulting from computing the Fourier spectrum, based on the equation: $m(u,v)=\sqrt{Re(s(u,v))^2+Im(s(u,v))^2}$, wherein $s(u,v)$ is a spectral point and $m(u,v)$ is a magnitude for the spectral point;
    transforming the calculated magnitude for the spectra to log-polar images based on the equation: $LP(logr,t)=m(U(logr,t),V(logr,t))$, wherein $U(logr,t)=R*exp(logr)*cos(t*dt)$, $V(logr,t)=R*exp(logr)*sin(t*dt)$, with a radial operating point R, angular delta dt, wherein logr and t are integral indices into a corresponding LP matrix, and wherein if a coordinate (U,V) does not coincide with a known point in $m(u,v)$, then (U,V) is calculated by interpolation; and
    performing super-resolution using (i) the extracted images following the transforming, and (ii) the sub-pixel motion estimates, to produce a super-resolved image.

2. The method of claim 1, wherein performing 2D registration further comprises using sub-pixel translation estimation.

3. The method of claim 2, further comprising performing correction for scale and rotation changes between the two images.

4. The method of claim 1, further comprising windowing and coarsely registering the two images.

5. The method of claim 1, wherein computing the Fourier spectrum comprises using a fast Fourier transform (FFT).

6. The method of claim 1, further comprising performing sub-pixel translation estimation between the two log-polar images.

7. The method of claim 6, further comprising estimating the rotation and scale change between the two images.

8. The method of claim 7, further comprising transforming one of the original two images to remove rotation and scale change.

9. The method of claim 8, wherein transforming one of the original two images comprises interpolation.

10. The method of claim 1, wherein windowing the two images comprises using a Hamming window.

11. The method of claim 1, wherein windowing the two images comprises using a Hanning window.

12. The method of claim 1, wherein windowing the two images comprises using a Gaussian window.

13. The method of claim 1, further comprising computing the Fourier Phase Correlation between the two images.

14. The method of claim 13, further comprising estimating sub-pixel translation from the Fourier Phase Correlation.

15. The method of claim 2, further comprising estimating a rigid translation between a probe image and reference images.

16. An article of manufacture comprising:
    a non-transitory machine readable storage medium; and
    executable program instructions embodied in the machine readable storage medium that when executed by a processor of a programmable computing device configures the programmable computing device to control an image processing system receiving a plurality of images, to perform functions for image resolution, including functions to:
    acquire a target at an initial frame;
    track a target through subsequent N−1 frames, wherein tracking the target through subsequent N−1 frames includes (i) proceeding across the N image frames in pairs of adjacent frames, (ii) for each pair of adjacent frames, performing pair-wise 2D similarity registration, and (iii) aggregating pair-wise motion estimates across N frames, to estimate the motion between each frame and the initial frame;
    calculate sub-pixel motion estimates of the target across all N frames, wherein the sub-pixel motion estimates indicate how a given pixel in each image frame maps back onto the initial image frame;
    extract an image from each of the N frames, wherein each extracted image is roughly centered on the target and is large enough to completely surround the target;
    compute the Fourier spectrum for the extracted images;
    calculated a magnitude for spectra resulting from computing the Fourier spectrum, based on the equation: $m(u,v)=\sqrt{Re(s(u,v))^2+Im(s(u,v))^2}$, wherein $s(u,v)$ is a spectral point and $m(u,v)$ is a magnitude for the spectral point; and
    transform the calculated magnitude for the spectra to log-polar images based on the equation: $LP(logr,t)=m(U(logr,t),V(logr,t))$, wherein $U(logr,t)=R*exp(logr)*cos(t*dt)$, $V(logr,t)=R*exp(logr)*sin(t*dt)$, with a radial operating point R, angular delta dt, wherein logr and t are integral indices into a corresponding LP matrix, and wherein if a coordinate (U,V) does not coincide with a known point in $m(u,v)$, then (U,V) is calculated by interpolation; and
    perform super-resolution using (i) the images extracted from the N frames following the transforming, and (ii) the sub-pixel motion estimates, to produce a super-resolved image.

17. The article of manufacture of claim 16, wherein performing 2D registration further comprises using sub-pixel translation estimation.

18. The article of manufacture of claim 17, further comprising instructions for performing estimation and correction for scale and rotation changes between the two images.

19. The article of manufacture of claim 16, further comprising instructions for windowing and coarsely registering the two images.

20. The article of manufacture of claim 16, wherein computing the Fourier spectrum comprises using a fast Fourier transform (FFT).

21. The article of manufacture of claim 16, further comprising instructions for performing sub-pixel translation estimation between the two log-polar images.

22. The article of manufacture of claim 21, further comprising instructions for estimating the rotation and scale change between the two images.

23. The article of manufacture of claim 22, further comprising instructions for transforming one of the original two images to remove rotation and scale change.

24. The article of manufacture of claim 23, wherein transforming one of the original two images comprises interpolation.

25. An image processing system configured to receive a plurality of input images and produce an image with higher resolution than the input images, the system comprising:
   a memory; and
   a processor connected to the memory and configured to:
      track a target through subsequent N−1 frames, wherein tracking the target through subsequent N−1 frames includes (i) proceeding across the N image frames in pairs of adjacent frames, (ii) for each pair of adjacent frames, performing pair-wise 2D similarity registration, and (iii) aggregating pair-wise motion estimates across N frames, to estimate the motion between each frame and the initial frame;
      calculate sub-pixel motion estimates of the target across all N frames, wherein the sub-pixel motion estimates indicate how a given pixel in each image frame maps back onto the initial image frame;
      extract an image from each of the N frames, wherein each extracted image is roughly centered on the target and is large enough to completely surround the target;
      compute the Fourier spectrum for the extracted images, and
      calculate a magnitude for spectra resulting from computing the Fourier spectrum, based on the equation: $m(u,v)=\operatorname{sqrt}(\operatorname{Re}(s(u,v))^2 + \operatorname{Im}(s(u,v))^2)$, wherein $s(u,v)$ is a spectral point and $m(u,v)$ is a magnitude for the spectral point;
      transform the calculated magnitude for the spectra to log-polar images based on the equation: $LP(\log r, t) = m(U(\log r, t), V(\log r, t))$, wherein $U(\log r, t) = R * \exp(\log r) * \cos(t * dt)$, $V(\log r, t) = R * \exp(\log r) * \sin(t * dt)$, with a radial operating point R, angular delta dt, wherein logr and t are integral indices into a corresponding LP matrix, and wherein if a coordinate (U,V) does not coincide with a known point in $m(u,v)$, then (U,V) is calculated by interpolation; and
      perform super-resolution using (i) the images extracted from the N frames following the transforming, and (ii) the sub-pixel motion estimates, to produce a super-resolved image.

26. The image processing system of claim 25, wherein performing 2D registration further comprises using sub-pixel translation estimation.

* * * * *